United States Patent
Park et al.

(10) Patent No.: US 9,693,268 B2
(45) Date of Patent: Jun. 27, 2017

(54) METHOD OF HANDOVER IN MOBILE COMMUNICATION SYSTEM

(71) Applicant: ELECTRONICS AND TELECOMMUNICATIONS RESEARCH INSTITUTE, Daejeon (KR)

(72) Inventors: Hyun Seo Park, Daejeon (KR); Yong Seouk Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 170 days.

(21) Appl. No.: 14/699,729

(22) Filed: Apr. 29, 2015

(65) Prior Publication Data

US 2015/0358864 A1 Dec. 10, 2015

(30) Foreign Application Priority Data

Jun. 5, 2014 (KR) .................. 10-2014-0068296
Jan. 20, 2015 (KR) .................. 10-2015-0009535

(51) Int. Cl.
| | | |
|---|---|---|
| *H04W 4/00* | (2009.01) | |
| *H04W 36/00* | (2009.01) | |
| *H04W 24/10* | (2009.01) | |
| *H04W 36/08* | (2009.01) | |
| *H04W 36/30* | (2009.01) | |

(52) U.S. Cl.
CPC ....... *H04W 36/0055* (2013.01); *H04W 24/10* (2013.01); *H04W 36/08* (2013.01); *H04W 36/30* (2013.01)

(58) Field of Classification Search
CPC .............................. H04W 4/00; H04W 76/048
USPC .................................. 370/328–339, 252–253
See application file for complete search history.

(56) References Cited

U.S. PATENT DOCUMENTS

| | | |
|---|---|---|
| 8,350,102 B2 | 1/2013 | Roberts, IV et al. |
| 8,350,103 B2 | 1/2013 | Roberts, IV et al. |
| 2010/0130211 A1 | 5/2010 | Bae et al. |
| 2010/0234027 A1 | 9/2010 | Han et al. |
| 2011/0044285 A1 | 2/2011 | Jang et al. |

(Continued)

FOREIGN PATENT DOCUMENTS

| | | |
|---|---|---|
| KR | 10-2010-0104022 A | 9/2010 |
| KR | 10-2011-0020398 A | 3/2011 |
| KR | 10-2014-0010998 A | 1/2014 |

OTHER PUBLICATIONS

3GPP TR 36.839 V11.1.0, Dec. 2012, Release 11.

(Continued)

*Primary Examiner* — Iqbal Zaidi
(74) *Attorney, Agent, or Firm* — Rabin & Berdo, P.C.

(57) ABSTRACT

A terminal starts a first timer for detecting an RLF (Radio Link Failure) when signal strength of a serving base station is lower than a reference value. The terminal triggers a handover without a TTT (Time to Trigger) for handover when signal strength of a target base station is greater than the signal strength of the serving base station by a first offset or more while the first timer is running. The terminal transmits a measurement report message regarding the signal strength of the target base station to the serving base station when a handover is triggered.

16 Claims, 10 Drawing Sheets

(56) References Cited

U.S. PATENT DOCUMENTS

| | | |
|---|---|---|
| 2011/0080825 A1* | 4/2011 | Dimou ................ H04J 11/0086 |
| | | 370/216 |
| 2012/0120822 A1 | 5/2012 | Cheon et al. |
| 2012/0309398 A1 | 12/2012 | Watanabe |
| 2013/0102818 A1 | 4/2013 | Roberts, IV et al. |
| 2014/0031027 A1* | 1/2014 | Dalsgaard ............ H04W 36/30 |
| | | 455/418 |
| 2015/0078335 A1* | 3/2015 | Sivanesan ......... H04W 74/0833 |
| | | 370/331 |

OTHER PUBLICATIONS

3GPP TR 36.331 V12.0.0, Dec. 2013, Release 12.
"Improvements to Handover Performance in LTE Networks", Aug. 14, 2014.

* cited by examiner

METHOD OF HANDOVER IN MOBILE COMMUNICATION SYSTEM

CROSS-REFERENCE TO RELATED APPLICATION

This application claims priority to and the benefit of Korean Patent Application Nos. 10-2014-0068296 and 10-2015-0009535 filed in the Korean Intellectual Property Office on Jun. 5, 2014 and Jan. 20, 2015, the entire contents of which are incorporated herein by reference.

BACKGROUND OF THE INVENTION (a) Field of the Invention

The present invention relates to a handover method for a terminal in a mobile communication system.

(b) Description of the Related Art

LTE (Long Term Evolution) mobile communication systems are in commercial use and provide services throughout the world. In LTE, a terminal performs a handover when moving from one base station to another. Specifically, the terminal reports the signal strength of surrounding base stations to a serving base station. The serving base station prepares a target base station to which the terminal will perform a handover, based on the signal strength report from the terminal, and orders the terminal to perform a handover. Upon receiving a handover command message from the serving base station, the terminal immediately performs a handover to attempt a connection to the target base station.

However, if a radio link in a handover area (temporal area or spatial area) is in a bad condition, it is difficult to transmit the signal strength report from the terminal to the serving base station in real time, and it is also difficult to transmit the handover command from the serving base station to the terminal in real time. Due to this, data interruption time during handover increases, and communication quality drops at the time of handover.

Moreover, the terminal triggers a handover only when the signal strength of the target base station is somewhat higher than the signal strength of the serving base station. Accordingly, where the signal strength of the target base station is slightly higher than the signal strength of the serving base station when the signal strength of the serving base station is not high, the terminal does not trigger a handover. Due to this, a radio link failure (RLF) may occur. After the occurrence of an RLF, the terminal performs an operation for selecting the target base station's cells to recover the RLF. Data is interrupted during this operation, causing the communication quality to drop.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a handover method and a communication method which enable a terminal to perform a handover to prevent an RLF.

An exemplary embodiment of the present invention provides a handover method for a terminal in a mobile communication system. The handover method includes: when signal strength of a serving base station is lower than a reference value, starting a first timer for detecting an RLF (Radio Link Failure); when signal strength of a target base station is greater than the signal strength of the serving base station by a first offset or more while the first timer is running, triggering a handover without a TTT (Time to Trigger) for handover; and when a handover is triggered, transmitting a measurement report message involving the signal strength of the target base station to the serving base station.

The triggering of a handover without a TTT may include: when the first timer is started after the start of the TTT, determining whether a difference in signal strength between the target base station and the serving base station is greater than the first offset; and when the difference in signal strength is greater than the first offset, immediately triggering a handover without waiting for the TTT.

The handover method may further include: receiving a handover command message from the serving base station ordering a handover to the target base station before the first timer expires; and executing a handover to the target base station based on the handover command message.

The handover method may further include: when the measurement report message has been transmitted to the serving base station but no handover command message has been received from the serving base station, determining whether the signal strength of the target base station is greater than the signal strength of the serving base station by a second offset or more; and when the signal strength of the target base station is greater than the signal strength of the serving base station by the second offset or more, force-terminating the first timer and then performing an RLF recovery process. The second offset may be greater than the first offset.

The performing of an RLF recovery process may include: forcing an RLF by causing the first timer to expire; and re-establishing a connection to the target base station.

The handover method may further include: when the first timer is not running and the signal strength of the target base station is greater than the signal strength of the serving base station by a second offset or more, triggering a handover and then transmitting the measurement report message to the serving base station; and when no handover command message has been received from the serving base station, forcing an RLF and then performing an RLF recovery process.

The performing of an RLF recovery process may include re-establishing a connection to the target base station.

The handover method may further include, when RSRQ (Reference Signal Received Quality) of the serving base station is equal to or greater than a first threshold value, omitting measurement of signal strength of a base station surrounding the terminal in order to maintain a connection to the serving base station.

Another exemplary embodiment of the present invention provides a handover method for a terminal which, upon receiving a handover command message from a serving base station, allows the terminal to determine a handover execution time without immediately executing a handover. The handover method includes: when a first timer for detecting an RLF (Radio Link Failure) is running and signal strength of a first target base station is greater than signal strength of the serving base station by a first offset or more, determining whether a first handover command message for the first target base station has been received or not; and when the first handover command message has been received, selecting the present time as the handover execution time and immediately executing a handover to the first target base station. The first offset may be greater than a handover margin for triggering a handover.

Still another exemplary embodiment of the present invention provides a terminal. The terminal includes: a measurement processor that measures signal strength of a serving base station and signal strength of a target base station; a timer driver that starts a first timer for detecting an RLF (Radio Link Failure), when the signal strength of the serving base station is lower than a reference value; a handover trigger processor that triggers a handover before a TTT (Time to Trigger) for handover expires, when the first timer is running and the signal strength of the target base station is greater than the signal strength of the serving base station by a first offset or more; and a measurement report processor that, when a handover is triggered, transmits a measurement report message involving the signal strength of the target base station to the serving base station.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, a terminal may indicate a mobile terminal (MT), an advanced mobile station (AMS), a high reliability mobile station (HR-MS), a subscriber station (SS), a portable subscriber station (PSS), an access terminal (AT), and user equipment (UE), and it may include entire or partial functions of the terminal, MT, MS, AMS, HR-MS, SS, PSS, AT, and UE.

In the specification, a base station (BS) may indicate an advanced base station (ABS), a high reliability base station (HR-BS), a node B (NodeB), an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (ARS) serving as a base station, a high reliability relay station (HR-RS) serving as a base station, and a small base station, and it may include entire or partial functions of the BS, ABS, HR-BS, nodeB, eNodeB, AP, RAS, BTS, MMR-BS, RS, RN, ARS, HR-RS, and small base station.

Figure 1:
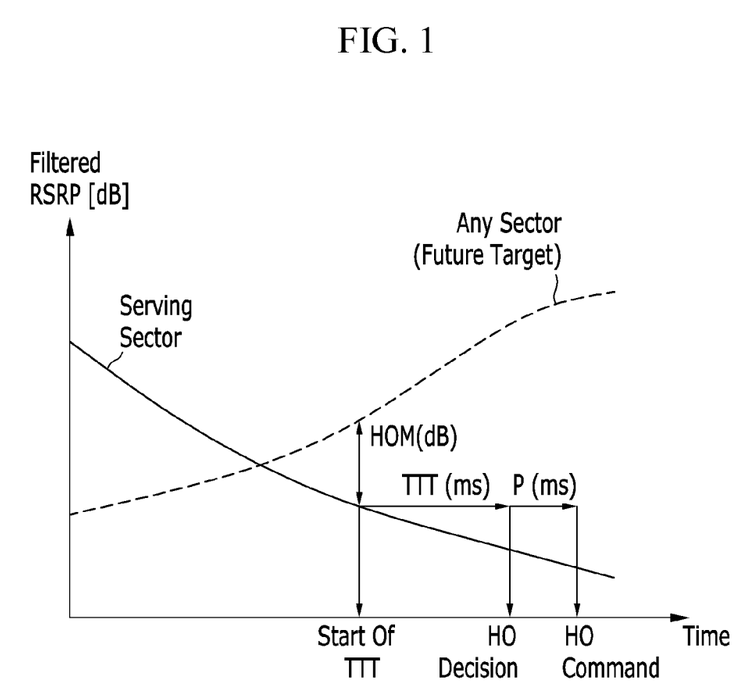
FIG. 1 is a view showing timing of a handover in an LTE system.

FIG. 1 is a view showing timing of a handover in an LTE system.

A terminal measures the signal strength (e.g., RSRP (Reference Signal Received Power)) of surrounding base stations. If the signal strength of a target base station is greater than the signal strength of a serving base station by a handover margin (HOM) or more during a given period of time (e.g., TTT (Time to Trigger)), the terminal transmits a measurement report message to the serving base station. The measurement report message may contain channel status information regarding the signal strength of the serving base station and the signal strength of the other surrounding base stations. The handover margin may be a first offset for an A3 event. The A3 event occurs when the signal strength of a neighboring base station is greater than the signal strength of the serving base station by the first offset or more.

The serving base station decides on a handover based on a signal strength report from the terminal. Then, the serving base station prepares a target base station to which the terminal will perform a handover, and the target base station decides whether to accept the terminal's handover or not, and notifies the serving base station of the decision.

The serving base station, upon receiving the target base station's acceptance of handover, transmits a handover command message (e.g., RRCConnectionReconfiguration message) to the terminal ordering the terminal to perform a handover to the target base station. Specifically, a handover preparation time (P [ms]) refers to the time from when the serving base station decides on a handover to when it transmits a handover command message.

However, if a radio link in a handover area is in a bad condition, it is difficult to transmit the signal strength report from the terminal to the serving base station in real time, and it is also difficult to transmit the handover command message from the serving base station to the terminal in real time. Accordingly, a handover does not occur in real time to the terminal's radio link condition. Thus, the data interruption time during the handover is lengthened, and the communication quality drops at the time of handover.

Meanwhile, if the signal strength of the serving base station is lower than Qout, the terminal starts a T310 timer. Qout is defined as the level at which control channel decoding errors occur at 10% or more. In the LTE standard, Qout is usually defined to be −8 dB. The T310 timer is a timer for detecting an RLF. If the signal strength of the serving base station is higher than Qin (e.g., −6 dB) after the T310 timer is started, the terminal stops the T310 timer. If the signal strength of the serving base station is not higher than Qin, the T310 timer expires and the terminal determines that an RLF has occurred. In the event of an RLF, the terminal performs an RLF recovery process. Specifically, upon detecting an RLF, the terminal attempts to perform an RLF recovery on the serving base station, and if the attempt to perform an RLF recovery on the serving base station fails, the terminal selects an appropriate base station capable of providing service to the terminal, among the surrounding base stations, and performs a re-establishment procedure for re-establishing a connection to the selected base station. In the RLF recovery process, the terminal selects the best cell by a cell selection process and attempts to re-establish a connection to the selected cell. The connection re-establishment is successful and enables resuming communication through the recovery process, only when the selected cell is a cell of the serving base station or a cell of a target base station prepared for handover. Otherwise, the connection re-establishment fails and the terminal performs a network connection procedure again from the start. When the terminal performs such an RLF recovery process, data interruption lasts for 1 second or more, which may cause a substantial drop in communication quality.

Figure 2:
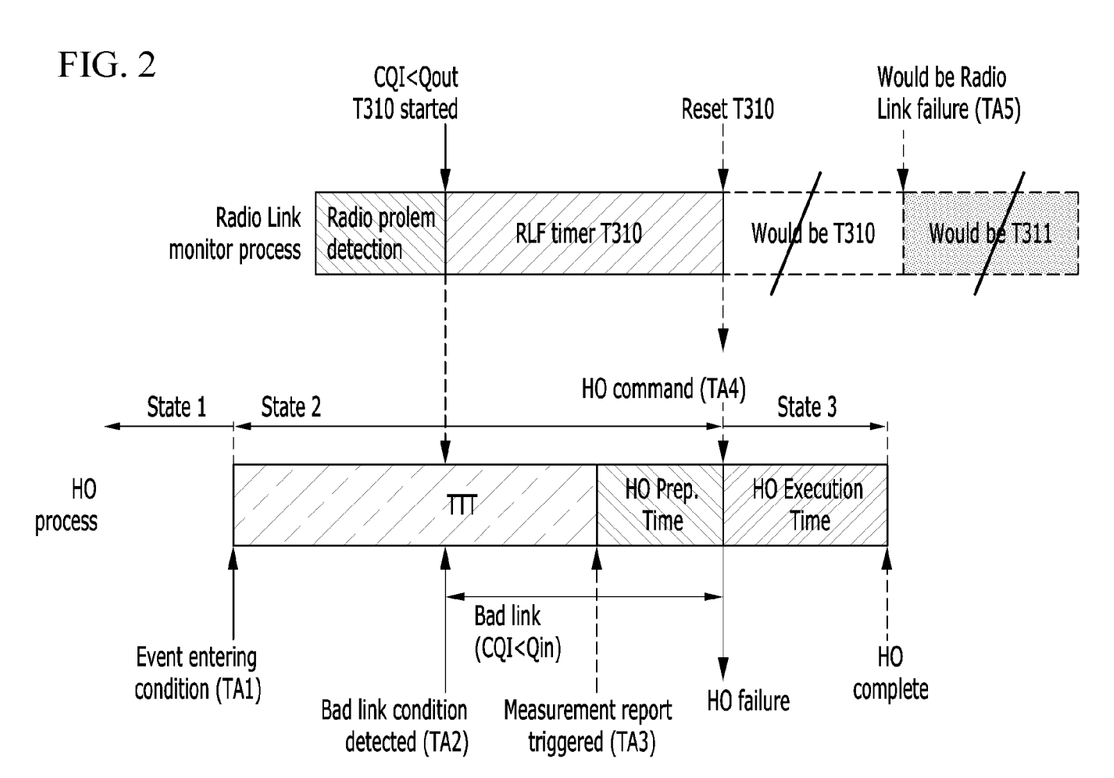
FIG. 2 is a view showing a first scenario of handover failure.
Figure 3:
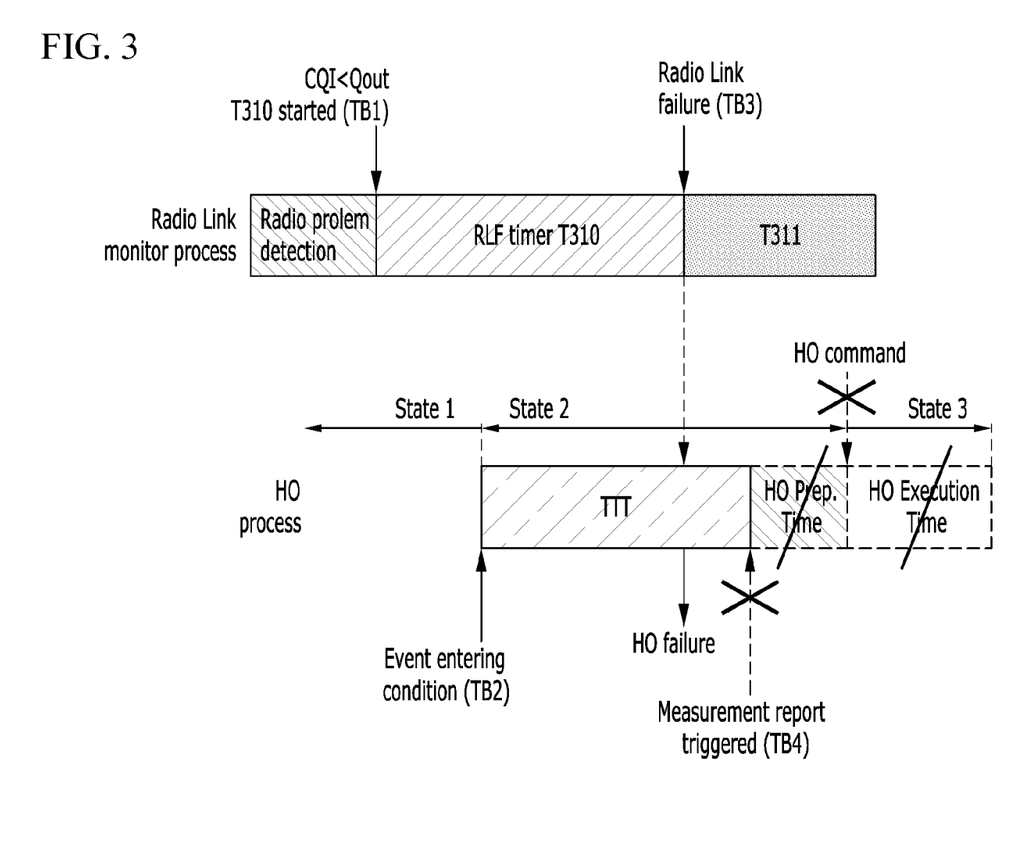
FIG. 3 is a view showing a second scenario of handover failure.

The 3GPP (3rd Generation Partnership Project) TR (Technical Report) 36.839 document defines two scenarios where, if a terminal is located in a handover area (e.g., cell boundary) in an LTE system, a handover signaling failure and an RLF might occur because the signal strength of a serving base station is not high. Referring to FIG. 2 and FIG. 3, the two scenarios will be described in detail.

FIG. 2 is a view showing a first scenario of handover failure.

While a terminal waits a TTT after an event entry condition (e.g., A3 event entry condition) is satisfied at time TA1, the terminal starts the T310 timer if the signal strength (e.g., CQI (Channel Quality Indicator)) of a serving base station is lower than Qout. Specifically, the terminal detects a bad link condition at time TA2. The A3 event entry condition is satisfied when the signal strength of a neighboring base station (target base station) is greater than the signal strength of the serving base station by a first offset or more.

Upon the expiration of the TTT (after the elapse of the TTT), the terminal triggers a handover at time TA3, and transmits a measurement report message to the serving base station.

If the terminal properly receives a handover command message after the elapse (TA4) of a handover preparation time from time TA3, it resets the T310 timer and performs a handover properly. However, a control channel decoding error occurs because the signal strength of the serving base station is lower than Qin (bad link condition) during the time between time TA2 and time TA4. Accordingly, this situation is defined as a handover failure.

On the other hand, if the T310 timer had expired, the terminal would have determined that an RLF had occurred at time TA5, and would have run a T311 timer.

FIG. 3 is a view showing a second scenario of handover failure.

If the signal strength (e.g., CQI) of the serving base station is lower than Qout at time TB1, the terminal runs the T310 timer.

If an event entry condition (e.g., A3 event entry condition) is satisfied at time TB2 after the T310 timer is started, the terminal waits a TTT.

If the terminal receives no handover command message and the T310 timer expires (e.g., at time TB3) before the time TB4 of expiration of the TTT, the terminal detects an RLF and attempts an RLF recovery. Accordingly, this situation is defined as a handover failure.

A handover method for preventing an RLF even if the signal strength of a serving base station is not high when a terminal is located in a handover area in an LTE system will be described in detail with reference to FIGS. 4 and 5. According to the handover method of FIG. 4 and FIG. 5, handover signaling can be successful, and a handover process can be successfully performed.

Figure 4:
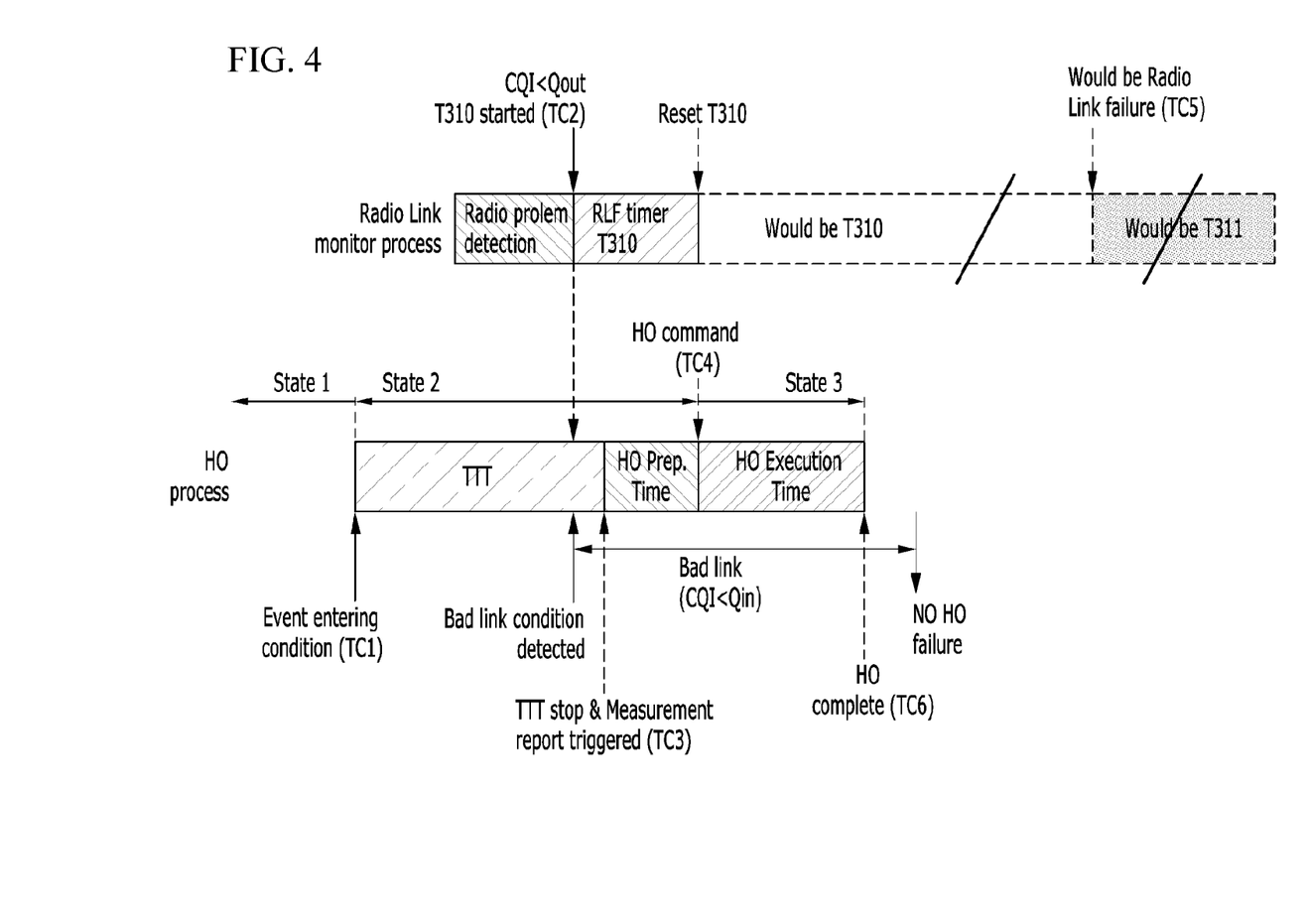
FIG. 4 is a view showing a handover method according to an exemplary embodiment of the present invention.

FIG. 4 is a view showing a handover method according to an exemplary embodiment of the present invention. Specifically, FIG. 4 is a view showing a method for a terminal to successfully perform a handover even in the event of the situation explained in FIG. 2.

If an event entry condition (e.g., A3 event entry condition) is satisfied at time TC1, the terminal waits a TTT.

If the signal strength (e.g., CQI) of a serving base station is lower than Qout (the terminal detects a bad link condition) before the time TC2 of expiration of the TTT, the terminal starts the T310 timer. Since there is a target base station whose signal strength is higher than that of the serving base station, the terminal immediately terminates the TTT (i.e., the terminal does not wait until the expiration of the TTT) and triggers a handover (e.g., at time TC3) before the TTT expires. The terminal transmits a measurement report message to the serving base station at time TC3.

The terminal properly receives a handover command message from the serving base station (e.g., at time TC4) before the time TC5 of expiration of the T310 timer. Upon receiving the handover command message, the terminal resets the T310 timer and properly performs a handover to the target base station. Since there is no RLF, the handover to the target base station is successful.

The handover to the target base station is complete at time TC6, and the terminal is connected to the target base station. Accordingly, no RLF occurs to the serving base station after time TC6.

Figure 5:
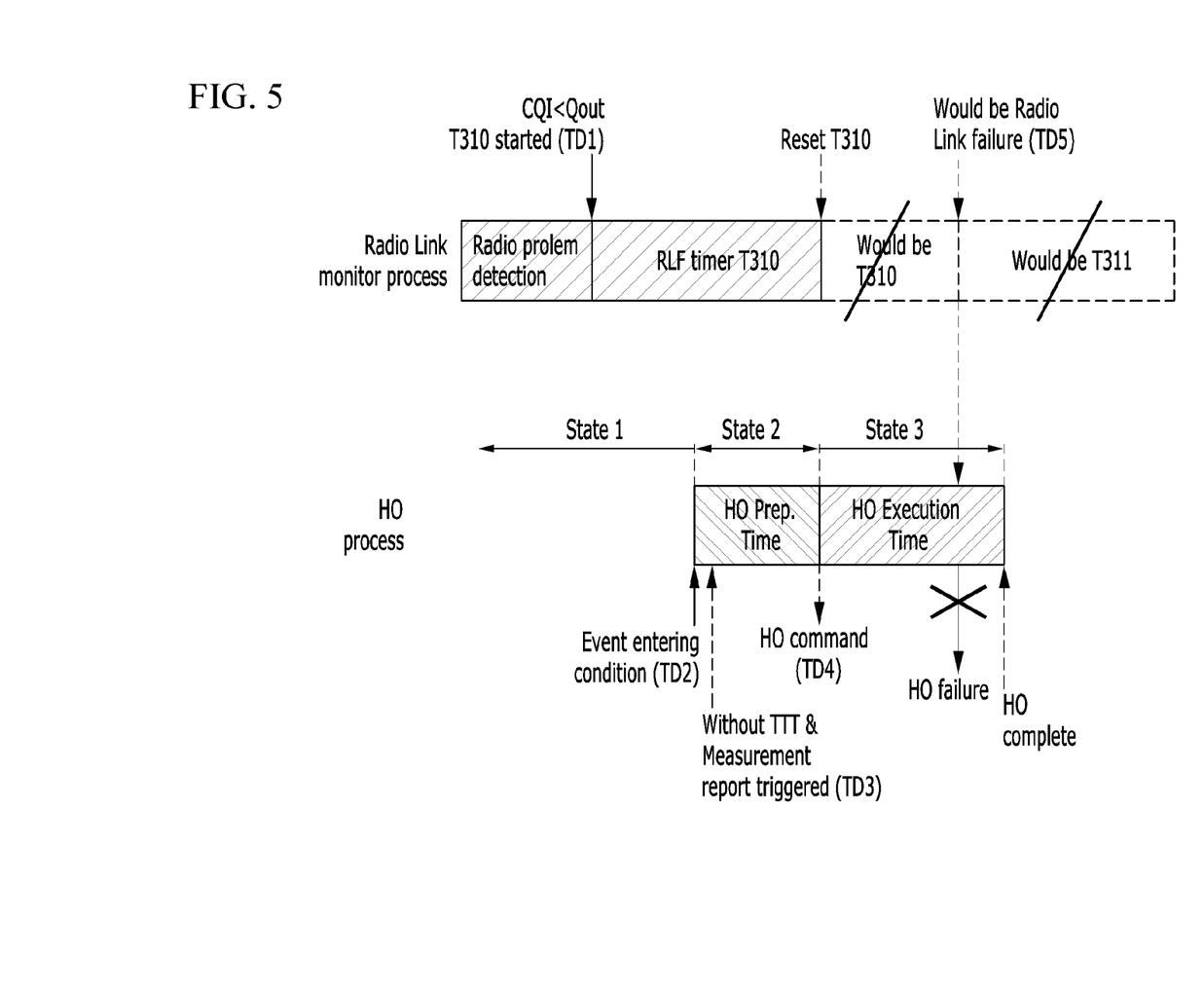
FIG. 5 is a view showing a handover method according to another exemplary embodiment of the present invention.

FIG. 5 is a view showing a handover method according to another exemplary embodiment of the present invention. Specifically, FIG. 5 is a view showing a method for a terminal to successfully perform a handover even in the event of the situation explained in FIG. 3.

If the signal strength (e.g., CQI) of a serving base station is lower than Qout at time TD1, the terminal starts the T310 timer.

If an event entry condition (e.g., there is a target base station whose signal strength is higher than that of the serving base station) is satisfied at time TD2 after the T310 timer is started, the terminal immediately triggers a handover without a TTT (without waiting a TTT). After triggering a handover at time TD3, the terminal transmits a measurement report message to the serving base station.

The terminal properly receives a handover command message from the serving base station (e.g., at time TD4) before the time TD5 of expiration of the T310 timer. Specifically, time TD4 refers to a point in time after a handover preparation time has elapsed from time TD2.

Upon receiving the handover command message, the terminal resets the T310 timer and properly executes a handover to the target base station. Since there is no RLF, the handover to the target base station is successful.

A detailed description will now be made with reference to FIGS. 6 and 7, with respect to a case where a terminal adaptively selects and performs an RLF recovery process during a handover process, depending on channel status.

Figure 6:
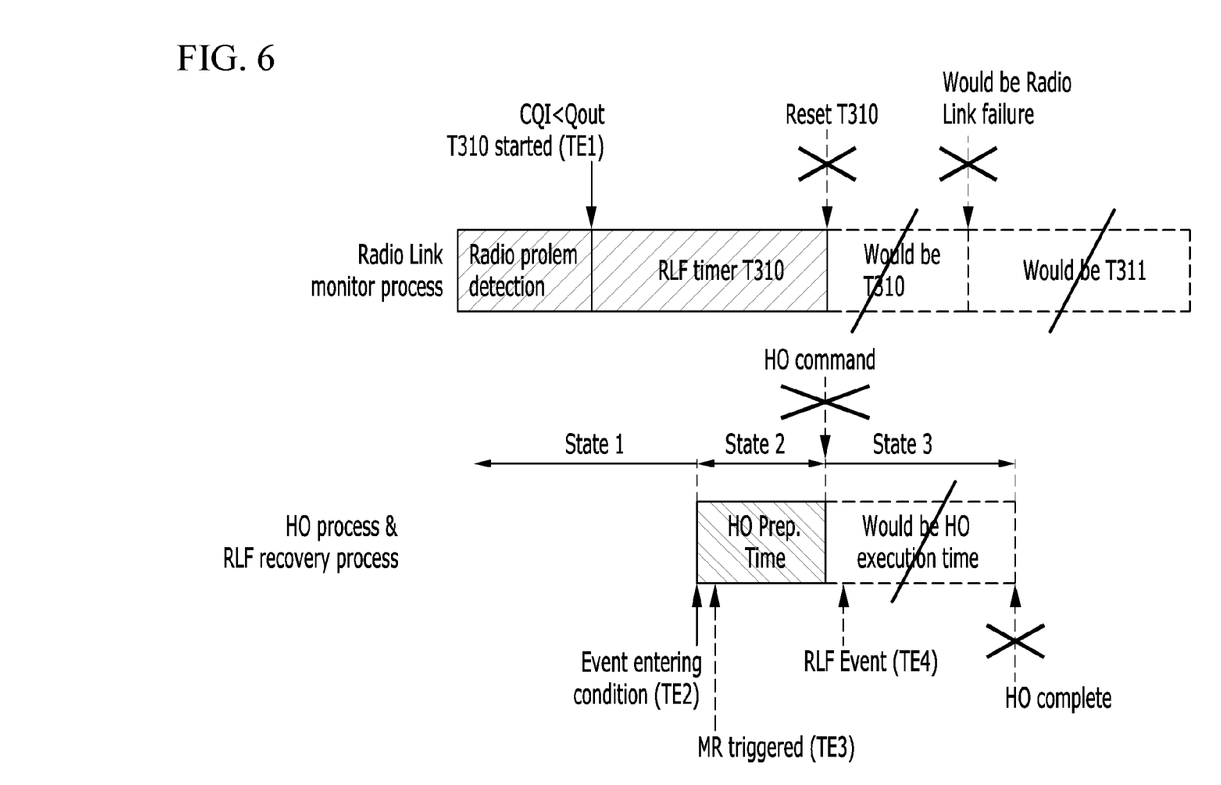
FIG. 6 is a view showing a communication method according to an exemplary embodiment of the present invention.

FIG. 6 is a view showing a communication method according to an exemplary embodiment of the present invention.

If the signal strength (e.g., CQI) of a serving base station is lower than Qout at time TE1, the terminal starts the T310 timer.

If an event entry condition (e.g., there is a target base station whose signal strength is higher than that of the serving base station) is satisfied at time TE2 after the T310 timer is started, the terminal immediately triggers a handover without a TTT.

After triggering a handover at time TE3, the terminal transmits a measurement report message to the serving base station.

However, if the terminal has transmitted a measurement report message to the serving base station but has received no handover command message from the serving base station, it force-terminates the T310 timer and then performs an RLF recovery process. Specifically, if the terminal has received no handover command message from the serving base station until a certain period of time has elapsed from time TE3, it may determine whether the signal strength of a target base station is greater than the signal strength of the serving base station by a second offset or more (second offset>first offset). If the signal strength of the target base station is greater than the signal strength of the serving base station by the second offset or more, the terminal may immediately (e.g., at time TE4) cause the T310 timer to expire and force an RLF without waiting for a handover command message any longer.

When an RLF occurs at time TE4, the terminal performs an RLF recovery process. Specifically, the terminal, in place of the serving base station, may select a target base station whose signal strength is high, and attempt an RLF recovery process to re-establish a connection to the target base station. As a consequence, the terminal is successfully connected to a target base station with high signal strength and communicates with it. As such, a better result can be achieved in terms of communication quality, compared to maintaining a connection to the serving base station and performing an RLF recovery process in the event of an RLF.

Also, in a case where the terminal runs the T310 timer while waiting a TTT, the terminal may force an RLF and then perform an RLF recovery process in a like manner, provided that the signal strength of a target base station is greater than the signal strength of a serving base station by a second offset or more and the terminal has transmitted a measurement report message to the serving base station but has received no handover command message.

Figure 7:
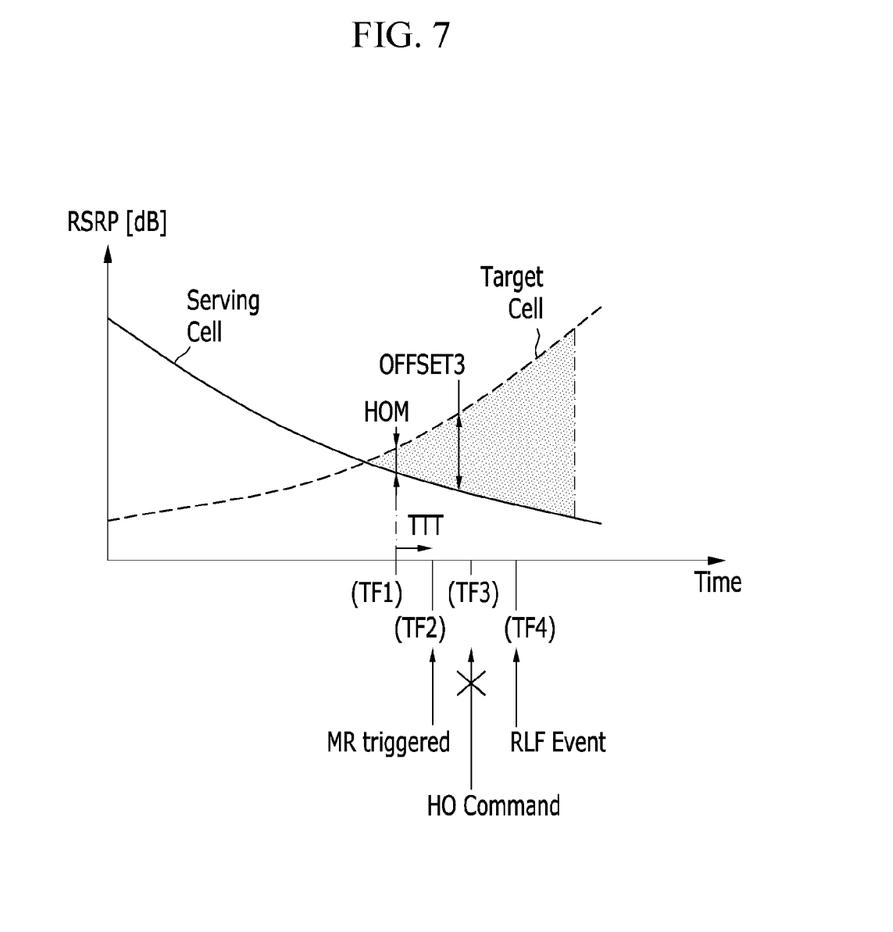
FIG. 7 is a view showing a communication method according to another exemplary embodiment of the present invention.

FIG. 7 is a view showing a communication method according to another exemplary embodiment of the present invention.

If an event entry condition (e.g., there is a target base station whose signal strength is higher than that of the serving base station) is satisfied at time TF1 while the T310 timer is not running, the terminal waits a TTT.

The terminal triggers a handover at the expiration (time TF2) of the TTT, and transmits a measurement report message to the serving base station.

However, if the terminal has transmitted a measurement report message to the serving base station but has received no handover command message from the serving base station, it forces an RLF and then performs an RLF recovery process. Specifically, if the terminal has received no handover command message from the serving base station until a certain period of time has elapsed (time TF3) from time TF2, it may determine whether the signal strength of a neighboring base station (target base station) is greater than the signal strength of the serving base station by a third offset OFFSET3 or more (third offset>second offset). If the signal strength of the target base station is greater than the signal strength of the serving base station by the third offset OFFSET3 or more, the terminal may immediately (e.g., at time TF4) cause the T310 timer to expire and force an RLF without waiting for a handover command message any longer since there is a target base station whose signal strength is much higher than the signal strength of the serving base station.

When an RLF occurs at time TF4, the terminal performs an RLF recovery process. As a consequence, the terminal is successfully connected to a target base station with high signal strength and communicates with it. As such, a better result can be achieved in terms of communication quality, compared to maintaining a connection to the serving base station and performing an RLF recovery process in the event of an RLF.

In FIG. 7, the signal strength of the serving base station is not deemed low, unlike in FIG. 6, because the T310 timer is not running. Accordingly, the difference in signal strength between the target base station and the serving base station should be equal to or greater than the third offset OFFSET3, in order for the terminal to force an RLF.

Meanwhile, a detailed description will be made with reference to FIG. 8, with respect to a case where a terminal, rather than a serving base station, decides itself whether to perform a handover or not.

Figure 8:
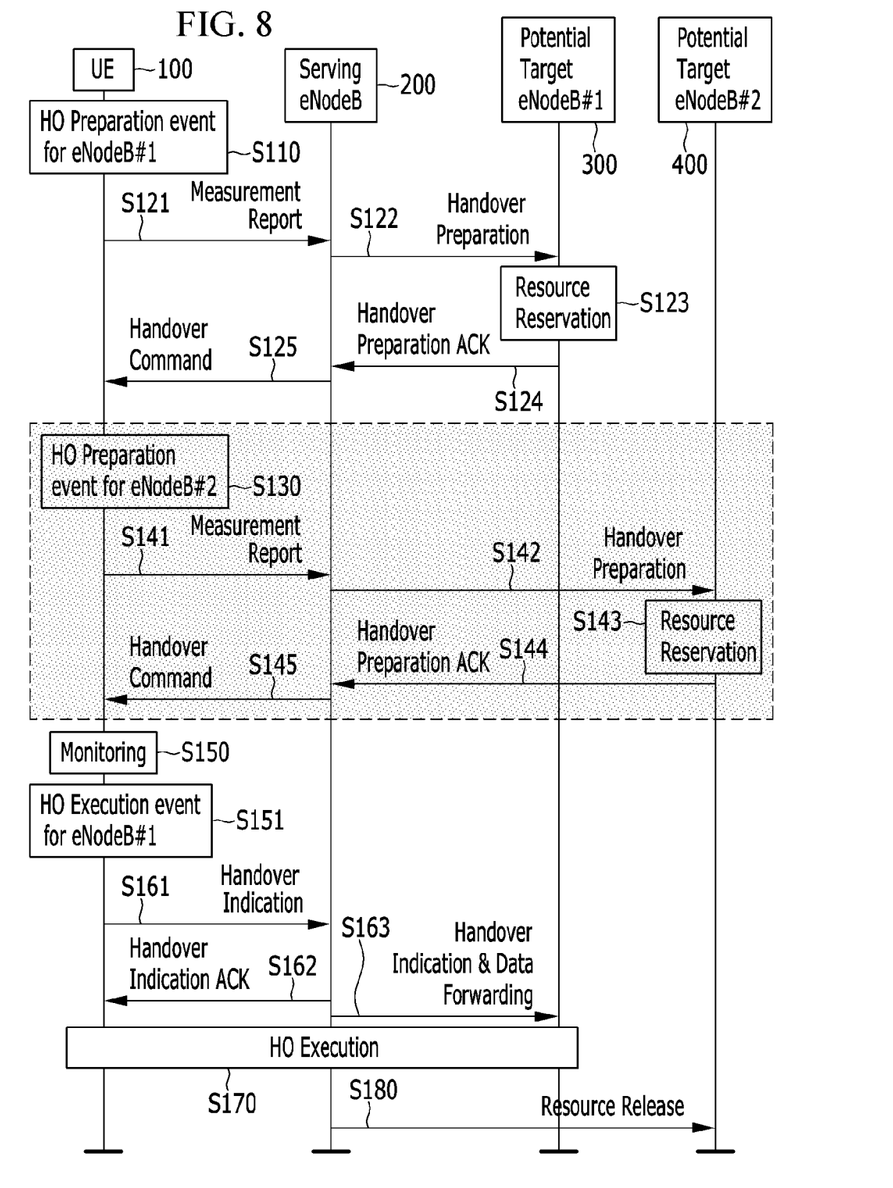
FIG. 8 is a flowchart showing a process for a terminal to perform a handover if the terminal supports the function of determining a handover execution time itself.

FIG. 8 is a flowchart showing a process for a terminal 100 to perform a handover if the terminal 100 supports the function (hereinafter, 'first function') of determining a handover execution time itself. Specifically, if the terminal 100 has received a handover command message from a serving base station 200, it may compare the signal strength of the serving base station 200 with the signal strength of a plurality of target base stations 300 and 400 and determine a handover execution time and a target base station that it will undergo a handover to, according to the result of the comparison.

If the difference in signal strength between the target base station 300 and the serving base station 200 is equal to or greater than a first offset, the terminal 100 detects that a handover preparation event for the target base station 300 has occurred (S110). The terminal 100 transmits a measurement report message involving the signal strength of the target base station 300 to the serving base station 200 (S121). The serving base station 200 has the target base station 300 prepare for handover (S122). The target base station 300 reserves resources (S123). The target base station 300 transmits an acknowledgment message to the serving base station 200, in response to a handover preparation request (S124). The serving base station 200 transmits a handover command message to the terminal 100 (S125).

If the difference in signal strength between the target base station 400 and the serving base station 200 is equal to or greater than the first offset, the terminal 100 detects that a handover preparation event for the target base station 400 has occurred (S130). The terminal 100, the serving base station 200, and the target base station 400 perform a process similar to that of S121 to S125 (S141 to S145).

Upon receiving a plurality of handover command messages from the serving base station 200, the terminal 100 does not immediately perform a handover but instead monitors the signal strength of the serving base station 200 and the signal strength of the target base stations 300 and 400 (S150). Specifically, the terminal 100 compares the signal strength of the serving base station 200 with the signal strength of the target base stations 300 and 400. Then, the terminal 100 selects a handover execution time and one of the target base stations 300 and 400 to perform a handover to, according to the result of the comparison. Specifically, the terminal 100 may determine if any one of the target base stations 300 and 400 maintains a signal strength difference of a fourth offset or more from the serving base station 200 during a set period of time. For example, if the signal strength of the target base station 300 is greater than the signal strength of the serving base station 200 by the fourth offset or more during a set period of time, the terminal 100 may determine that a handover execution event has occurred. The terminal 100 may select the time of occurrence of a handover execution event as the handover execution time, and select the target base station 300 between the target base stations 300 and 400 as a base station that it will undergo a handover to.

Upon detecting the occurrence of a handover execution event for the target base station 300 through the step S150 (S151), the terminal 100 may generate a handover indication message indicating the execution of a handover and transmit it to the serving base station (S161).

The serving base station 200 transmits an acknowledgment message to the terminal 100, in response to the handover indication message (S162). Then, the serving base station 200 passes the handover indication message to the target base station 300, and forwards data to be transmitted to the terminal 100 to the target base station 300 (S163).

Having received the acknowledgement message in the step S162, the terminal 100 executes a handover to the target base station 300 (S170).

The serving base station 200 requests the other target base station 400 to release the reserved resources (S180).

Meanwhile, if the terminal 100 supporting the first function has received a handover command message for the target base station 300 from the serving base station 200 while the T310 timer is running, the terminal 100 may immediately execute a handover to the target base station 300, provided that the signal strength of the target base station 300 is greater than the signal strength of the serving base station 200 by a fifth offset or more (fifth offset>first offset) (provided that there is a target base station 300 whose signal strength is higher than that of the serving base station 200). That is, the terminal 100 does not spend time determining if any one of the target base stations 300 and 400 maintains a signal strength difference of the fifth offset or more from the serving base station 200 during a set period of time, but instead may immediately execute a handover to the target base station 300. The fifth offset may be equal to the second offset.

The communication method described above with reference to FIG. 4 to FIG. 7 may also be applied to the terminal 100 supporting the first function.

Specifically, if the terminal 100 supporting the first function has transmitted a measurement report message involving the signal strength of the target base station 300 to the serving base station 200 but has not received a handover command message for the target base station 300 from the serving base station 200, the terminal 100 may determine whether the T310 timer is currently running or not. If the T310 timer is running, the terminal 100 may force an RLF depending on the difference in signal strength between the target base station 300 and the serving base station 200. For example, if the signal strength of the target base station 300 is greater than the signal strength of the serving base station 200 by the fifth offset or more, the terminal 100 may immediately terminate the T310 timer (cause the T310 to expire) and then perform an RLF recovery process since there is a target base station whose signal strength is much higher than the signal strength of the serving base station. As a consequence, the terminal 100 may be connected to the target base station 300 through the RLF recovery process.

Alternatively, if the terminal 100 supporting the first function has transmitted a measurement report message involving the signal strength of the target base station 300 to the serving base station 200 but has not received a handover command message for the target base station 300 from the serving base station 200, the terminal 100 may determine whether the T310 timer is currently running or not. If the T310 timer is not running, the terminal 100 may force an RLF depending on the difference in signal strength between the target base station 300 and the serving base station 200. For example, if the signal strength of the target base station 300 is greater than the signal strength of the serving base station 200 by the fifth offset or more, the terminal 100 may immediately force an RLF and then perform an RLF recovery process since there is a target base station whose signal strength is much higher than the signal strength of the serving base station (sixth offset>fifth offset). The sixth offset may be equal to the third offset OFFSET3. As a consequence, the terminal 100 may be connected to the target base station 300 through the RLF recovery process.

Figure 9:
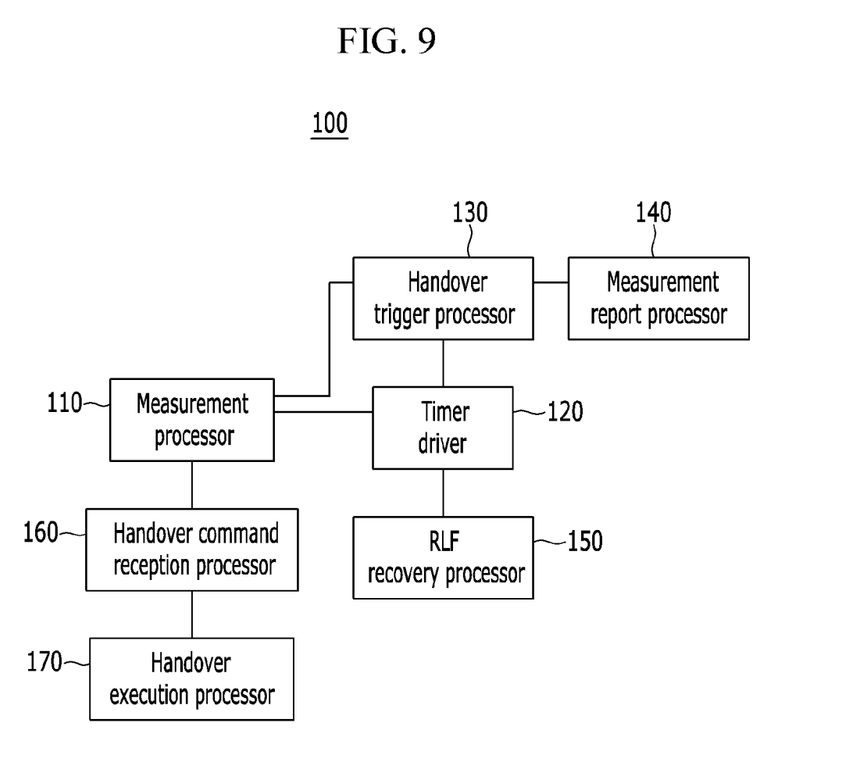
FIG. 9 is a view showing the configuration of a terminal according to an exemplary embodiment of the present invention.

FIG. 9 is a view showing the configuration of a terminal 100 according to an exemplary embodiment of the present invention. Specifically, FIG. 9 illustrates a terminal 100 that does not support the first function. The terminal 100 of FIG. 9 may perform operations associated with the handover method or communication method described above with reference to FIGS. 4 to 7.

The terminal 100 includes a measurement processor 110, a timer driver 120, a handover trigger processor 130, a measurement report processor 140, an RLF recovery processor 150, a handover command reception processor 160, and a handover execution processor 170.

The measurement processor 110 measures the channel status (e.g., signal strength) of a serving base station 200 and of surrounding base stations 300 and 400.

The timer driver 120 controls a timer (e.g., T310 timer or T311 timer). Specifically, the timer driver 120 may perform control operations for the T310 timer and the T311 timer described above with reference to FIGS. 4 to 7. For example, if the signal strength of the serving base station 200 is lower than Qout, the timer driver 120 may start the T310 timer.

The handover trigger processor 130 may trigger a handover based on the difference in signal strength between the serving base station 200 and the target base stations 300 and 400. Specifically, the handover trigger processor 130 may perform operations associated with the triggering of handover described above with reference to FIGS. 4 to 7. For example, if the signal strength of the target base station 300 is greater than the signal strength of the serving base station 200 by the first offset or more while the T310 timer is running, the handover trigger processor 130 may immediately trigger a handover without waiting a TTT.

When a handover is triggered, the measurement report processor 140 transmits a measurement report message to the serving base station 200. Specifically, the measurement report processor 140 may perform operations associated with the transmission of the measurement report message described above with reference to FIGS. 4 to 7.

When an RLF occurs, the RLF recovery processor 150 performs an RLF recovery process. Specifically, the RLF recovery processor 150 may perform the RLF recovery process described above with reference to FIGS. 4 to 7. For example, when the T310 timer expires, the RLF recovery processor 150 may determine that an RLF has occurred, and perform an RLF recovery process.

The handover command reception processor 160 receives a handover command message from the serving base station 200. Specifically, the handover command reception processor 160 may perform operations associated with the reception of the handover command message described above with reference to FIGS. 4 to 7.

The handover execution processor 170 executes a handover to the target base stations 300 and 400, based on the handover command message. Specifically, the handover execution processor 170 may perform operations associated with the handover execution described above with reference to FIGS. 4 to 7.

Figure 10:
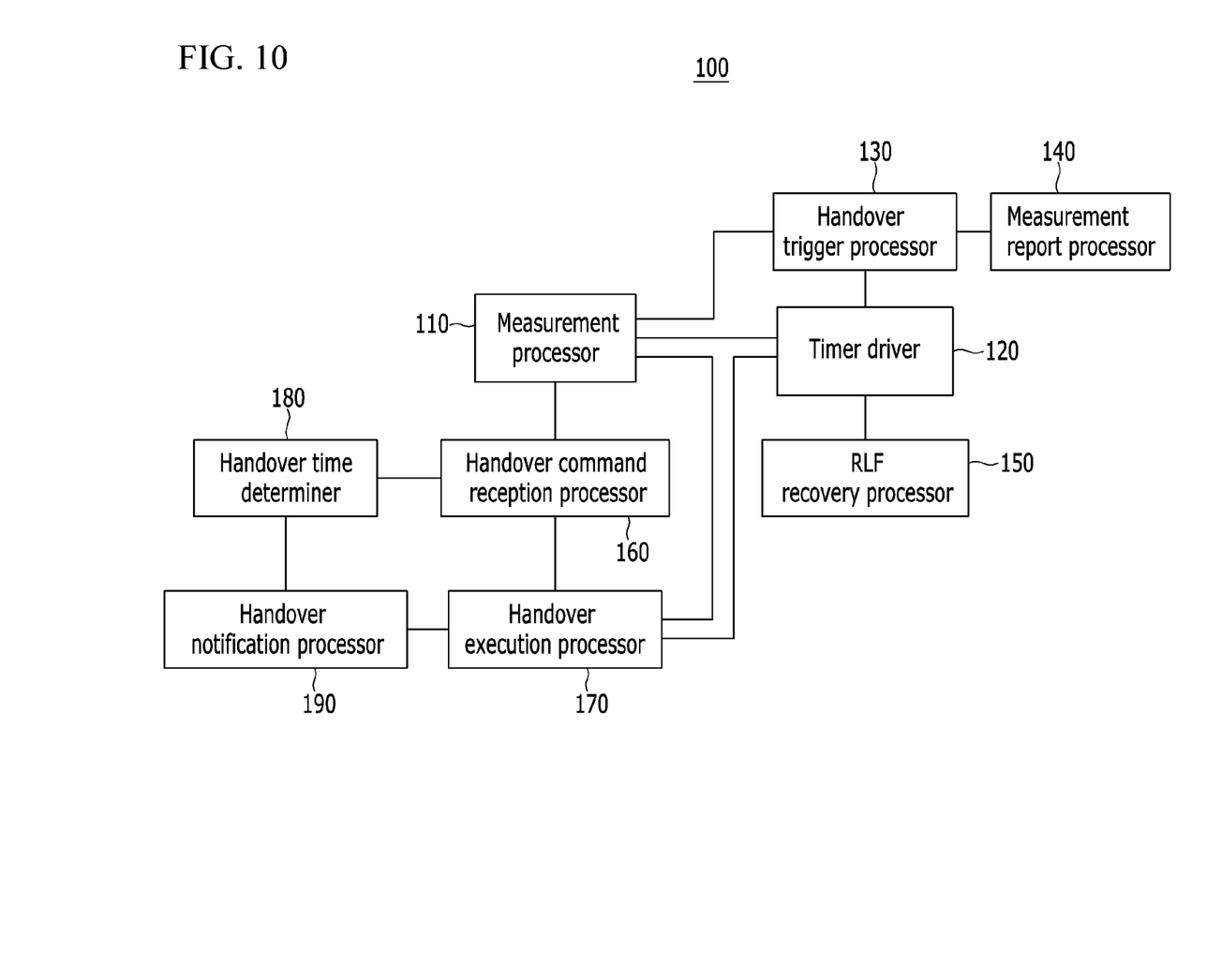
FIG. 10 is a view showing the configuration of a terminal according to another exemplary embodiment of the present invention.

FIG. 10 is a view showing the configuration of a terminal 100 according to another exemplary embodiment of the present invention. Specifically, FIG. 10 illustrates a terminal 100 that does not support the first function. The terminal 100 of FIG. 10 may perform operations associated with the handover method or communication method described above with reference to FIGS. 4 to 8.

The terminal 100 of FIG. 10 may further include a handover time determiner 180 and a handover notification processor 190, in addition to the components of the terminal 100 shown in FIG. 9.

The handover time determiner 180 may select a handover execution time and a target base station to which the terminal 100 will perform a handover, based on the difference in signal strength between the serving base station 200 and the target base stations 300 and 400. Specifically, the handover time determiner 180 may perform operations associated with the determination of the handover execution time described above with reference to FIG. 8. If the handover time determiner 180 determines that the present time is the handover execution time, the handover notification processor 190 may generate a handover indication message and transmit it to the serving base station 200. Specifically, the handover notification processor 190 may perform operations associated with the transmission of the handover indication message described above with reference to FIG. 8.

Meanwhile, if the handover execution processor 170 of FIG. 10 has received a handover command message for the target base station (e.g., 300) while the T310 timer is running, it may not wait for the handover time determiner 180 to determine the handover execution time depending on the difference in signal strength between the serving base station 200 and the target base station 300. For example, if the signal strength of the target base station 300 is greater than the signal strength of the serving base station 200 by the fifth offset or more, the handover execution processor 170 may immediately execute a handover to the target base station 300, without waiting for the handover time determiner 180 to determine the handover execution time (or the handover time determiner 180 may select the present time as the handover execution time).

Meanwhile, if the RSRQ (Reference Signal Received Quality) of the serving base station 200 is equal to or greater than a threshold value, the terminal of FIG. 9 or FIG. 10 may not perform channel status measuring operations, regardless of whether it supports the first function or not. Specifically, if the RSRQ of the serving base station 200 is equal to or greater than the threshold value, the terminal 100 may receive a high-quality signal from the serving base station 200 and hence does not need to be connected to other base stations. Accordingly, if the RSRQ of the serving base station 200 is equal to or greater than the threshold value, the terminal 100 may not need to measure the signal strength of the surrounding base stations 300 and 400 and transmit a measurement report message in order to maintain a connection to the serving base station 200.

According to an embodiment of the present invention, when the signal strength of a target base station is higher than the signal strength of a serving base station when the signal strength of the serving base station is not high, the terminal may quickly trigger and execute a handover to the target base station. Therefore, an RLF can be prevented, and a handover can be performed successfully.

According to an exemplary embodiment of the present invention, communication quality can be improved by preventing an RLF that may occur in a cell boundary.

Furthermore, according to an embodiment of the present invention, a terminal can perform a handover in a mobile communication system by selecting the best cell, while preventing the occurrence of an RLF.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A handover method for a terminal in a mobile communication system, the handover method comprising:
   when signal strength of a serving base station is lower than a reference value, starting a first timer for detecting an RLF (Radio Link Failure);
   when signal strength of a target base station is greater than the signal strength of the serving base station by a first offset or more while the first timer is running, triggering a handover without a TTT (Time to Trigger) for handover; and
   when a handover is triggered, transmitting a measurement report message involving the signal strength of the target base station to the serving base station,
   wherein the triggering of a handover without a TTT includes
      when the first timer is started after the start of the TTT, determining whether a difference in signal strength between the target base station and the serving base station is greater than the first offset; and
      when the difference in signal strength is greater than the first offset, triggering a handover without waiting for the TTT.

2. The handover method of claim 1, further comprising:
   receiving, from the serving base station, a handover command message ordering a handover to the target base station before the first timer expires; and
   executing a handover to the target base station based on the handover command message.

3. The handover method of claim 1, further comprising:
   when the measurement report message has been transmitted to the serving base station but no handover command message has been received from the serving base station, determining whether the signal strength of the target base station is greater than the signal strength of the serving base station by a second offset or more; and
   when the signal strength of the target base station is greater than the signal strength of the serving base station by the second offset or more, force-terminating the first timer and then performing an RLF recovery process, wherein the second offset is greater than the first offset.

4. The handover method of claim 3, wherein the performing of an RLF recovery process comprises:
   forcing an RLF by causing the first timer to expire; and
   re-establishing a connection to the target base station.

5. The handover method of claim 1, further comprising:
when the first timer is not running and the signal strength of the target base station is greater than the signal strength of the serving base station by a second offset or more, triggering a handover and then transmitting the measurement report message to the serving base station; and
when no handover command message has been received from the serving base station, forcing an RLF and then performing an RLF recovery process,
wherein the second offset is greater than the first offset.

6. The handover method of claim 5, wherein the performing of an RLF recovery process comprises re-establishing a connection to the target base station.

7. The handover method of claim 1, further comprising, when RSRQ (Reference Signal Received Quality) of the serving base station is equal to or greater than a first threshold value, omitting measurement of signal strength of a base station surrounding the terminal in order to maintain a connection to the serving base station.

8. A handover method for a terminal which, upon receiving a handover command message from a serving base station, allows the terminal to determine a handover execution time without executing a handover, the handover method comprising:
when a first timer for detecting an RLF (Radio Link Failure) is running, and
when signal strength of a first target base station is greater than signal strength of the serving base station by at least a handover margin, triggering the handover without a TTT (Time to Trigger) for handover and transmitting a measurement report message involving the signal strength of the first target base station to the serving base station, and
when the signal strength of the first target base station is greater than the signal strength of the serving base station by at least a first offset, determining whether a first handover command message for the first target base station has been received or not; and
when the first handover command message has been received, selecting the present time as the handover execution time and executing the handover to the first target base station, wherein
the first offset is greater than the handover margin for triggering the handover.

9. The handover method of claim 8, further comprising, when a result of the determination of whether the first handover command message has been received or not shows that the terminal has transmitted the measurement report message to the serving base station but has not received the first handover command message, force-terminating the first timer and performing an RLF recovery process.

10. The handover method of claim 9, wherein the performing of an RLF recovery process comprises:
forcing an RLF by terminating the first timer; and
re-establishing a connection to the first target base station.

11. The handover method of claim 8, further comprising, when the first timer is not running, the signal strength of the target base station is greater than the signal strength of the serving base station by a second offset or more, and the terminal has transmitted a measurement report message to the serving base station but has received no first handover command message, forcing an RLF and then performing an RLF recovery process, wherein the second offset is greater than the first offset.

12. The handover method of claim 11, wherein the performing of an RLF recovery process comprises:
when the first timer is not running and the signal strength of the first target base station is greater than the signal strength of the serving base station by the second offset or more, determining whether the measurement report message has been transmitted to the serving base station or not; and
when the measurement report message has been transmitted but the first handover command message has not been received from the serving base station, forcing an RLF and then re-establishing a connection to the first target base station.

13. The handover method of claim 8, further comprising, when an RSRQ (Reference Signal Received Quality) of the serving base station is equal to or greater than a first threshold value, omitting measurement of signal strength of a base station surrounding the terminal in order to maintain a connection to the serving base station.

14. A terminal comprising:
a measurement processor that measures signal strength of a serving base station and signal strength of a target base station;
a timer driver that starts a first timer for detecting an RLF (Radio Link Failure), when the signal strength of the serving base station is lower than a reference value;
a handover trigger processor that triggers a handover before a TTT (Time to Trigger) for handover expires, when the first timer is running and the signal strength of the target base station is greater than the signal strength of the serving base station by a first offset or more; and
a measurement report processor that, when a handover is triggered, transmits a measurement report message involving the signal strength of the target base station to the serving base station, wherein
the measurement processor determines whether a difference in signal strength between the target base station and the serving base station is greater than the first offset when the first timer is started after the start of the TTT, and
the handover trigger processor triggers a handover without waiting for the TTT when the difference in signal strength is greater than the first offset.

15. The terminal of claim 14, further comprising an RLF recovery processor that, when the first timer expires, determines that an RLF has occurred and performs an RLF recovery process, wherein,
when a handover command message has not been received from the serving base station, the measurement processor determines whether the signal strength of the target base station is greater than the signal strength of the serving base station by a second offset or more,
when the signal strength of the target base station is greater than the signal strength of the serving base station by the second offset or more, the timer driver force-terminates the first timer, and
the second offset is greater than the first offset.

16. The terminal of claim 14, further comprising a handover time determiner that, after receiving a handover command message from the serving base station, determines whether to perform a handover to the target base station or not and a handover execution time, depending on a difference in signal strength between the serving base station and the target base station, wherein,
when the first timer is running, the signal strength of the target base station is greater than the signal strength of the serving base station by a second offset or more, and a handover command message for the target base station has been received, the handover time determiner selects the present time as the handover execution time, and the second offset is greater than the first offset.

* * * * *